March 27, 1956 S. KRISTMANN ET AL 2,739,345
APPARATUS FOR OPENING AND CLEANING POULTRY GIZZARDS
Filed Dec. 20, 1954 5 Sheets-Sheet 1
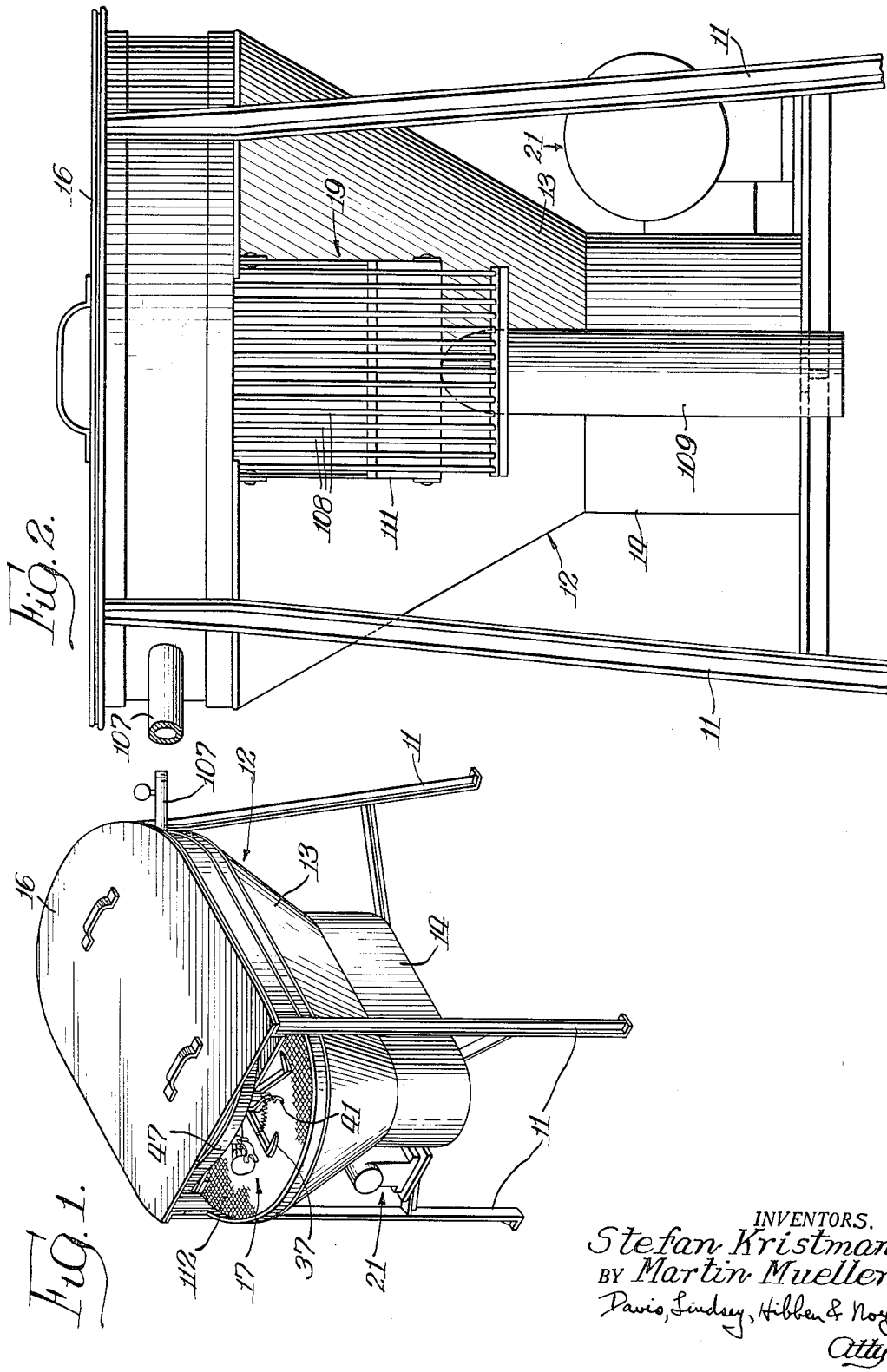
INVENTORS.
Stefan Kristmann
BY Martin Mueller,
Davis, Lindsey, Hibben & Noyes
Atty's.

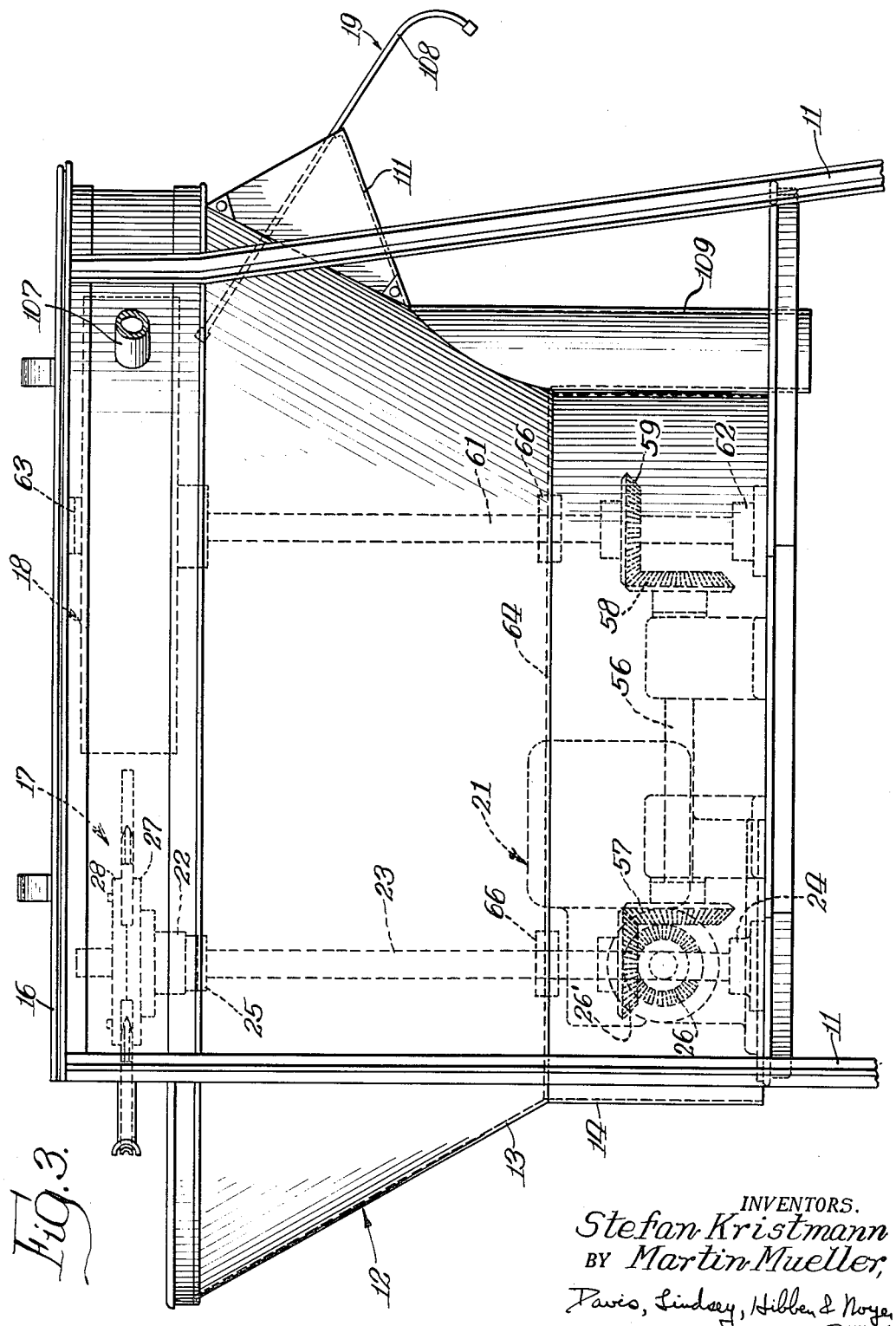

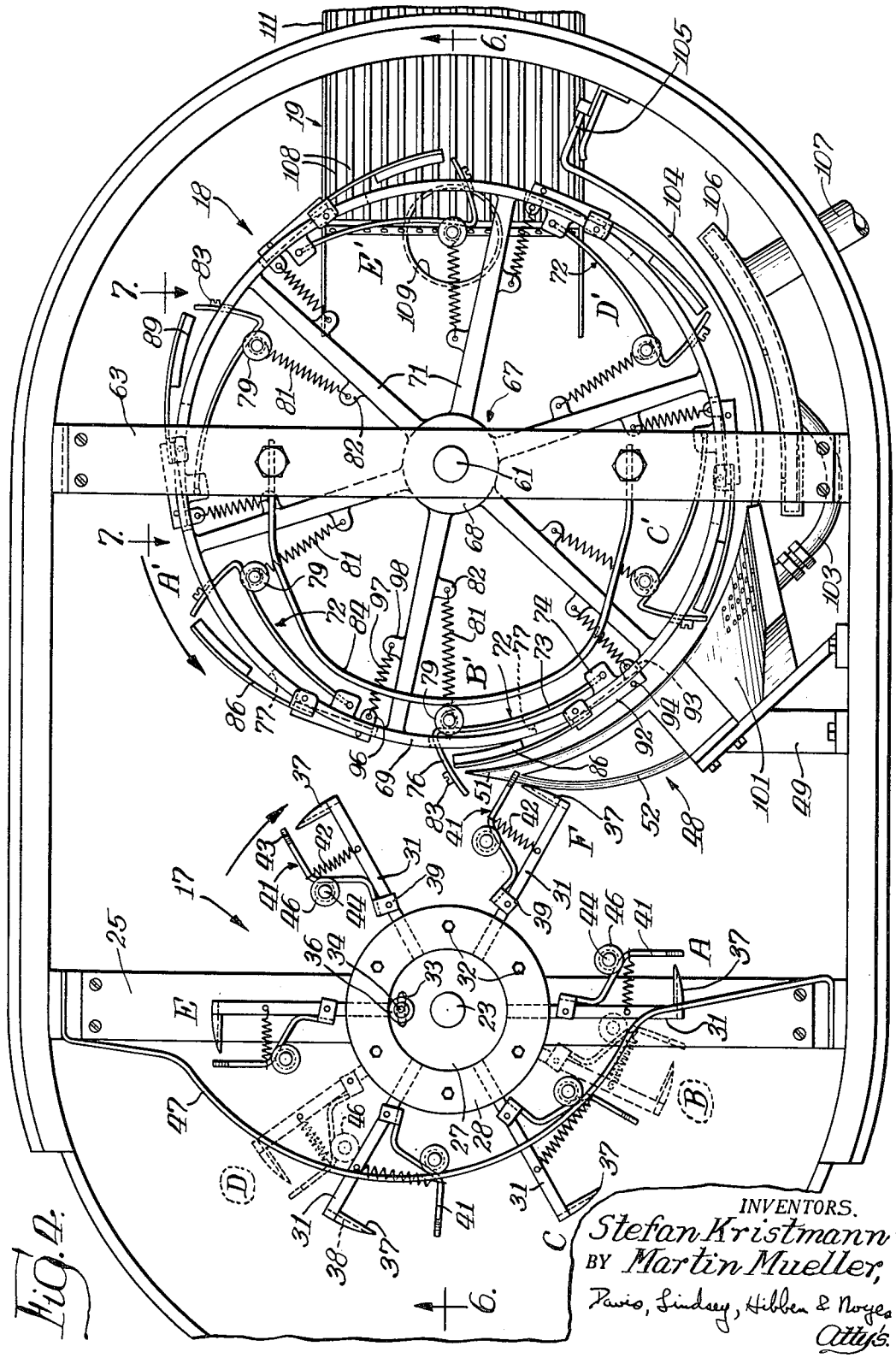

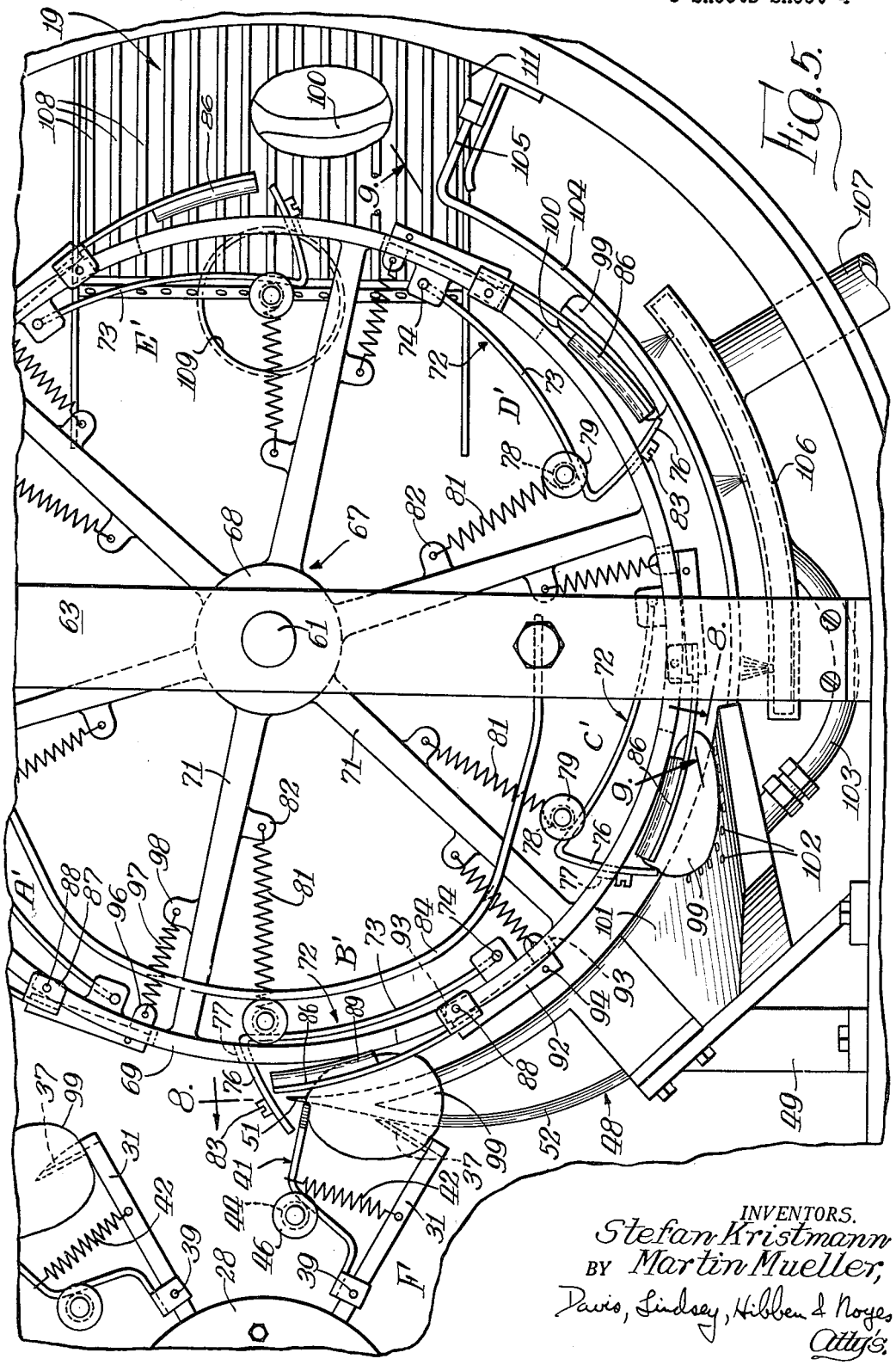

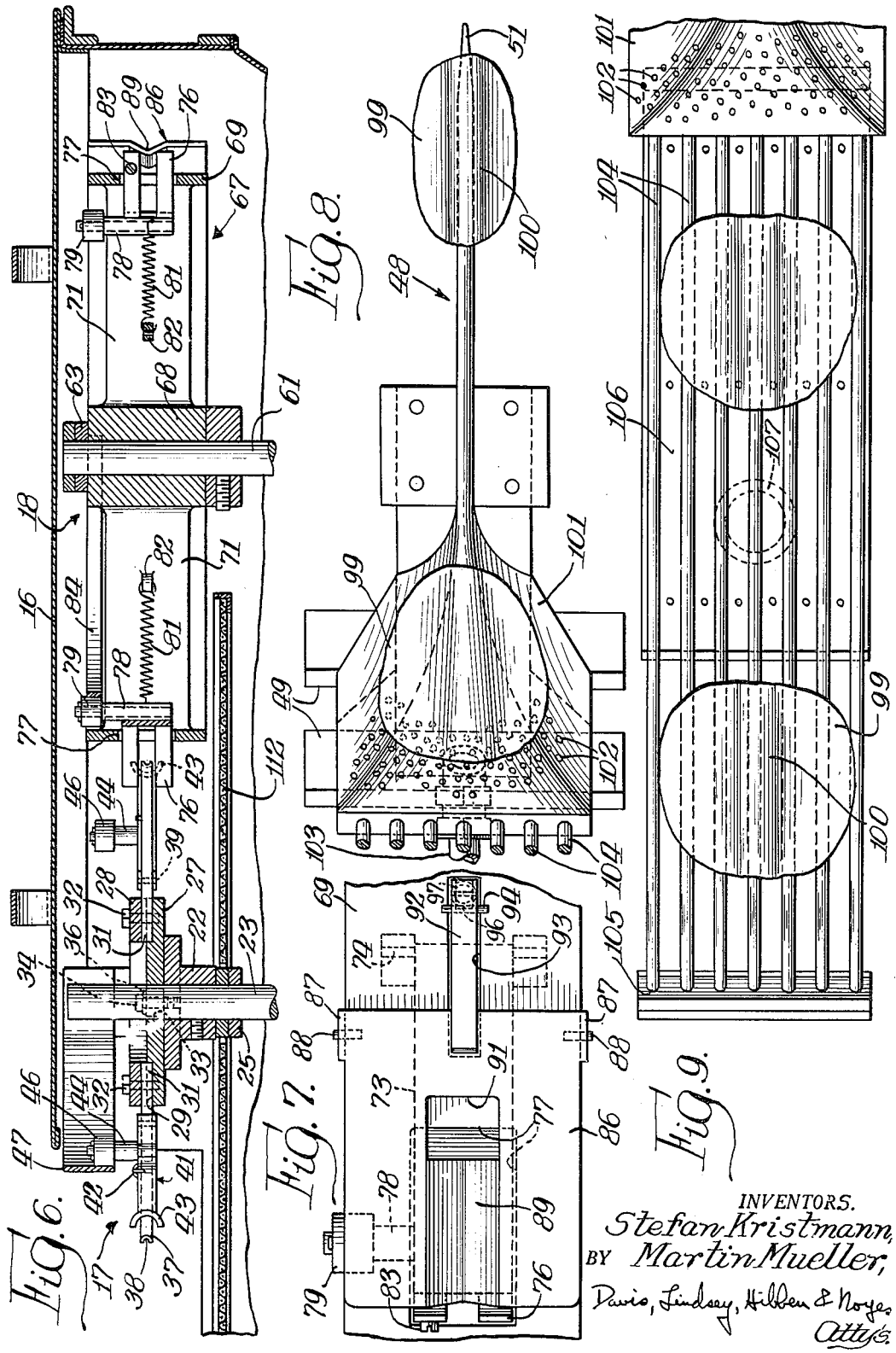

United States Patent Office 2,739,345
Patented Mar. 27, 1956

2,739,345
APPARATUS FOR OPENING AND CLEANING POULTRY GIZZARDS

Stefan Kristmann and Martin Mueller, Chicago, Ill., assignors to Krist Engineering & Manufacturing Corporation, Chicago, Ill., a corporation of Illinois Application December 20, 1954, Serial No. 476,248

26 Claims. (Cl. 17—11)

This invention relates to novel and improved apparatus for use in opening and cleaning poultry gizzards or the like.

In the preparation and dressing of poultry on a commercial scale such as in poultry packing houses or the like, the poultry is frequently cut up before packaging or distribution. Obviously, it is desirable that all usable portions of the poultry be thoroughly cleaned and otherwise prepared for immediate cooking by the purchaser without the necessity of further processing. In this connection, the poultry gizzards must be cut open and the contents cleaned out before the gizzards are packed or sold. Although frequently such cleaning and preparation of poultry gizzards have been performed entirely by hand, we are aware of the fact that certain continuous machinery has been proposed to facilitate rapid opening and cleaning of the gizzards, e. g. the device shown in the Biddinger et al. Patents Nos. 2,657,424 and 2,663,899. However, we have invented a vastly improved continuous gizzard cleaning apparatus which is characterized by a much higher potential output rate of cleaned gizzards, greater operating simplicity and increased safety for operating personnel, and a highly compact, sanitary, self-cleaning construction.

Accordingly, a primary object of the present invention is to provide a novel and improved apparatus for cutting open or slitting poultry gizzards and thereafter cleaning the same.

A further object of the invention is to provide an improved machine of the foregoing type characterized by the novel combination of a gizzard feeder unit and a co-operating slitting and cleaning unit adapted to receive gizzards automatically from the feeder unit.

Another object of the invention is to provide a novel poultry gizzard slitting apparatus capable of exceptionally high output rates and having valuable safety features for minimizing the chance of injury to operating personnel.

An additional object of the invention is to provide an improved machine of the foregoing type characterized by a novel compact structural arrangement having improved self-cleaning advantages from a sanitary viewpoint and which is capable of handling gizzards of varying sizes.

Other objects and advantages of the invention will become apparent from the subsequent detailed description taken in conjunction with the accompanying drawings, wherein:

Fig. 1 is a perspective view of a machine constituting one specific embodiment of the invention;

Fig. 2 is an enlarged end elevational view of the device shown in Fig. 1;

Fig. 3 is an enlarged side elevational view of the machine shown in Fig. 1;

Fig. 4 is an enlarged top plan view of the machine with the cover removed and showing successive operating positions of certain elements of the device;

Fig. 5 is a fragmentary view on a further enlarged scale of a portion of the structure shown in Fig. 4 and illustrating the progressive movement of a gizzard through the machine;

Fig. 6 is a fragmentary vertical sectional view through the device as taken along the line 6—6 of Fig. 4;

Fig. 7 is a fragmentary elevational view taken along the line 7—7 of Fig. 4 and illustrating a certain structural detail of the machine;

Fig. 8 is a fragmentary internal elevational view as seen along the line 8—8 of Fig. 5 and showing the movement of a gizzard along the slitting or cutting section of the machine; and Fig. 9 is a fragmentary internal elevational view as seen along the line 9—9 of Fig. 5 and illustrating the movement of the gizzard through the cleaning section of the machine following the cutting operation.

Referring to the drawings, the machine comprises a rigid upright frame having a plurality of legs 11 and supporting a generally elliptical housing 12 with an inwardly sloping peripheral wall 13 and a depending skirt portion 14. A removable cover 16 is provided for enclosing the major portion of the operating mechanism, although one end of the housing 12 projects beyond the frame and cover of the machine (Fig. 1) for operating access to the internal mechanism during use of the device.

As hereinafter described in greater detail, the internal mechanism comprises a rotatable feeder or transfer unit, designated generally at 17 (Fig. 3), and a cooperating rotatable carrier unit, designated generally at 18, the latter being adapted to receive gizzards from the feeder unit 17 and to move the gizzards progressively through splitting, spreading, and washing or cleaning stages in a rapid and continuous manner. As will readily be seen, the rotatable units 17 and 18 are mounted for rotation in a horizontal plane in side-by-side relation. Access to the feeder or transfer unit 17 is had through the open end of the machine illustrated in Fig. 1 whereby the operator can feed the gizzards one at a time into the machine, and at the opposite end of the machine the opened and cleaned gizzards are discharged one by one onto an inclined chute or grid 19. A motor and gear reduction unit 21 (Fig. 3) is mounted on the external framework of the device and has operating connections with a suitable drive means within the skirt 14 for operating the rotatable units 17 and 18.

The feeder or transfer unit 17 is in the form of a rotatable spider comprising a hub portion 22 (Fig. 6) rigidly secured to a vertical shaft 23 for rotation therewith and having a two piece pale support rigidly, but adjustably, fastened thereto. The shaft 23 has a lower bearing 24 and is supported at its upper end in a cross member 25 extending rigidly across the housing 12. The shaft 23 is driven from the motor 21 through a bevel gear connection, as at 26 and 26' in Fig. 3. The pale support mounted on the hub 22 consists of a bottom plate 27 (Fig. 6) and an uppermost flat annular ring 28 each having complementary radially extending grooves which cooperate to provide a plurality of radial bores 29 of square or other non-circular cross-section. The inner ends of a plurality of pale rods 31 are fitted in the bores 29 and are frictionally secured therein by the clamping action between the ring 28 and the plate 27, the latter being detachably secured together by means of a plurality of screws 32. For purposes of permitting proper operating coaction with the unit 18, as described below, the pale support 27—28 is provided with a circumferential or rotatable adjustment relative to the hub 22. For this purpose, the plate 27 has a short arcuate slot 33 (Figs. 4 and 6), and an adjusting screw 34 extends through a washer 36 and the slot 33 into a threaded aperture in the hub 22. It will be understood that by loosening the screw 34, the entire pale support 27—28 can be shifted circumferentially relative to the hub 22 to the extent permitted by the arcuate slot 33 and thereby affording bodily circumferential adjustment of the entire set of pale supports 31 as a unit. Moreover, by means of the screws 32 and the clamping action between the plate 27 and the ring 28, the pale supports 31 can be individually adjusted for any desired degree of radial projection or extension from the support 27—28.

At the outer end of each pale rod 31, a sharp pointed pale or spike 37 (Fig. 4) extends rigidly at right angles to its supporting rod 31 and is adapted to have a poultry gizzard impaled thereon by the operator of the machine. Each such pale or pointed element 37 is formed with a longitudinal groove 38 (Fig. 6), such groove preferably being formed by means of a generally U-shaped cross-section for the pale 37. As best seen in Fig. 4 all of the pales 37 point in the same circumferential direction and the direction of rotation of the feeder unit 17 (clockwise as seen in Fig. 4) is always such that the points of the pales 37 are the trailing ends with respect to the direction of movement thereof. Thus, when an operator located at the feed end of the machine manually thrusts the gizzards on the moving pales 37, it will be seen that the sharp pointed pales are always moving in a direction away from the operator thereby minimizing the danger of injury to operating personnel.

Each of the pale support arms 31 has pivoted thereto, as at 39, a holder or clamping arm 41 (Fig. 4) which is resiliently held in a normally closed position relative to the pale 37 by means of a spring 42. The outer end of the clamp arm 41 is grooved or bifurcated to provide a generally Y-shaped terminus, as at 43 (Fig. 6). Each of the pivoted clamping arms 41 carries an upright roller shaft 44 (Fig. 6) with a cam roller 46 mounted at the upper end thereof. An elongated cam track 47 having a curved intermediate portion is rigidly mounted across the upper portion of the housing 12 and above the rotatable feeder 17 for coaction with the cam rollers 46.

As hereinafter described in greater detail, stationary knife means designated generally at 48 is rigidly supported between the rotatable feed and carrier units 17 and 18 by means of a bracket 49 mounted on the side wall of the housing 12. The knife means 48 is generally curved or arcuate in shape and has an elongated pointed end portion 51 and an elongated curved cutting edge 52, the point 51 of the knife being disposed directly in the path of movement of the operating portions of the feed and carrier means 17 and 18.

Referring to Figs. 4 and 5, the operation of the feed means 17 is as follows. In the illustrated embodiment, the rotatable feed unit 17 is provided with six of the radially extending pale supports 31, as indicated in full lines in Fig. 4. However, it will be understood that this number may be varied if desired. In Fig. 4 the successive operating positions of the gizzard holders 31—37—41 are designated by the letters A to F as the feed unit 17 rotates in a clockwise direction. Thus, at A the clamping arm 41 of the gizzard holder is fully closed by the action of the spring 42 and the holder is approaching the cam track 47. As indicated in dotted lines at B, the cam roller 46 makes initial contact with the cam track 47 and continued rotation of the unit 17 results in outward pivoting or opening of the arm 41 as seen in position C. Thereafter, the cam roller 46 moves for a substantial distance along the cam track 47 and retains the gizzard holder in fully open position during continued rotation of the feed units 17. During this time, the operator manually impales a gizzard on the moving pale 37. As the holder with the gizzard impaled thereon reaches the dotted line position shown at D, the cam roller 46 disengages from the cam track 47 and allows the pivoted clamping arm 41 to be spring pressed into engagement with the gizzard for holding the same on the pale 37, as best seen in Figs. 1 and 5. Continued rotation of the feed unit 17 moves the closed gizzard holder with gizzard impaled and clamped thereon from position E to position F wherein the moving gizzard holder encounters the pointed end 51 of the knife means 48. At the instant of alignment of the pale 37 with the pointed knife end 51, the knife blade is received within the pale groove 38 and is aligned therewith so that the terminus of the knife point 51 enters the gizzard at substantially the same axial opening which has already been pierced in the gizzard by the pale 37 thereby automatically transferring the gizzard from the pale 37 to a similar impaled position on the knife point 51. As the feed unit 17 continues to rotate, the pivoted clamp arm 41 yields sufficiently to disengage itself from the gizzard now impaled on the stationary knife means 48 (Fig. 5 at position F). Also the bifurcated shape of the clamp arm end 43 allows this arm to straddle and clear the knife blade in the same manner as the grooved pale 37.

Referring now to the rotatable gizzard carrier unit 18, this unit is likewise driven from the motor 21 through geared connections comprising in this case a shaft 56 having a bevel gear 57 at one end meshing with the bevel gear 26′ and also having a similar bevel gear 58 at its other end meshing with a bevel gear 59 carried on a vertical shaft 61 parallel to the shaft 23. A suitable bottom bearing 62 is mounted on the framework of the device at the lower end of the shaft 61, and the upper end of the shaft 61 is journaled in a cross member 63 extending rigidly between the opposite sides of the housing 12. As seen in Fig. 3, the shafts 23 and 61 extend upwardly through a closed bottom or partition 64 in the housing 12 and suitable shaft seals, as at 66, are provided for preventing water or other fluid from flowing downwardly along the shafts.

The rotatable carrier means 18 comprises a support in the form of a wheel 67 having a hub portion 68 keyed to the upper end of the shaft 61 for rotation therewith and a peripheral rim portion 69 which is supported from the hub 68 by means of a plurality of radial spokes 71. At suitable circumferentially spaced points around the periphery of the rim 69 are mounted a plurality of pivotal generally L-shaped or hook-shaped carrier elements or claws 72 adapted to engage and move the gizzards along the knife means 48. Each claw 72 has an elongated arm portion 73 which is curved to conform generally to the curvature of the rim 69 and is pivotally supported, as at 74, at the inside of rim 69. The other leg of the claw 72 is relatively shorter, as at 76, and extends outwardly from the leg 73 in projecting relation through an elongated slot 77 in the rim 69. Each claw 72 has rigidly mounted on the inner pivoted leg portion 73 thereof an upright roller shaft 78 (Fig. 6) carrying a cam roller 79. Moreover, each claw 72 is normally urged into its innermost pivoted position by means of a spring 81 secured at one end thereof to the shaft 78 and anchored at its other end to a lug 82 projecting from the adjacent spoke 71. The projecting claw leg 76 is bifurcated, as best seen in Fig. 6, and also carries a small projection or abutment such as a screw 83 for engaging the rim 69 at the edge of the corresponding rim slot 77 whereby to limit the extent of inward retraction of the claw 72 under the influence of the spring 81.

Immediately below the cross support 63 but above the spokes 71 of the wheel 67 a generally semi-circular band or cam track 84 is rigidly supported for coaction with the cam rollers 79. As the wheel 67 rotates in a counter-clockwise direction as seen in Fig. 4, the cam rollers 79 are brought successively into camming engagement with the track 84 thereby urging the pivotally supported claws 72 outwardly against the action of their respective springs 81 so as to project the bifurcated claw arms 76 into gizzard-engaging position as more fully described below. As also described below, continued rotation of the wheel 67 eventually moves each of the cam rollers 79 into disengaged relation with respect to the cam track 84 whereupon the claw leg 76 is resiliently returned to its normally retracted position.

Associated with each of the pivoted claws 72 is a flapper or presser member 86 (Fig. 7) in the form of a curved plate fitted at the exterior of the rim 69 and pivotally connected thereto, as by a pair of laterally bent ears 87 and pivot pins 88 extending therethrough into the side edges of the rim 69. The presser 86 has an inward V-shaped depression or groove 89 for accommodating a poultry gizzard and also has an opening 91 between the grooved portion 89 and the remaining portion of the plate 86. Each plate 86 has a short actuating lever arm 92 rigidly attached to the plate 86 at the pivoted end of the latter. The lever arm 92 fits in a corresponding slot 93 in the rim 69 and carries an abutment in the form of a transverse stop pin 94 and an inwardly extending lug 96 projecting through the slot 93. A spring 97 (Fig. 4 and 5) interconnects the lug 96 with an anchor lug 98 on the adjacent spoke 71 whereby the presser 86 is normally urged outwardly but is resiliently depressible inwardly against the action of the spring 97. The extent of outward pivoting of the plate 86 is limited by engagement of the pin 94 with the rim 69. As clearly seen in Fig. 7, in the event that the presser 86 is depressed inwardly into engagement with the rim 69, the slot 77 in the rim 69 is of sufficient size to accommodate the groove or depression 89 in the presser plate.

Referring again to Figs. 4 and 5, the operation of the carrier 18 and its coaction with the feed unit 17 will now be described. The wheel 67 is provided with six sets of claws 72 and coacting pressers 86 to correspond to the six gizzard holding mechanisms on the feed unit 17. The drive connections to the shafts 23 and 61 are so coordinated and the feed unit 17 is so adjusted as to obtain synchronized operation of the units 17 and 18 such that during simultaneous rotation of the two units in opposite directions the projected claws 72 are moved in alternating or interdigitating relation between successive gizzard holders on the feed unit 17. In other words, as each gizzard holder moves by the stationary knife means 48 and automatically transfers a gizzard in impaled relation on the knife point 51, a cooperating claw member 72 on the carrier 18 immediately follows to engage the gizzard and complete the cutting operation. This important adjustment feature and the synchronized operating relation of the unit 17 and 18 will be quite clear from Figs. 4 and 5. As hereinbefore described, the circumferential and radial adjustment features of the support 27—28 for the gizzard holder arms 31 facilitates accurate operating synchronization and interdigitation of the two units.

As indicated by the arrows in Fig. 4, the feed unit 17 rotates in a clockwise direction and the unit 18 rotates in opposite or counterclockwise direction so that the operating elements carried by the two rotating units always move toward the pointed end 51 of the knife means 48. In Fig. 4, the various operating positions of the claws 72 on the rotating carrier unit 18 are identified by the letters A' to E'. In position A', the claw 72 is still held in retracted position by means of its spring 81 but the cam roller 79 is approaching a position of camming engagement with the track 84. At the same time the corresponding presser or flapper 86 is resiliently held in its outermost pivoted position by its spring 97. By the time the carrier unit 18 has rotated to the B' position, the action of the outwardly bulged cam track 84 against the cam roller 79 has caused the bifurcated end 76 of the claw to be fully projected from the rim 69 through the slot 77 into the path of the pointed knife end 51. As heretofore mentioned, the operation of the units 17 and 18 is so synchronized that as each gizzard holder on the unit 17 moves beyond the knife point 51 and impales a gizzard thereon, a cooperating fully projected claw portion 76 immediately follows (Fig. 5) and engages the trailing end of the impaled gizzard so as to move the latter bodily along the knife blade.

This condition is best illustrated in Fig. 5 wherein a gizzard 99 is shown in impaled position on the end of the knife blade with the pale 37 in the process of being disengaged from the gizzard and the projected claw portion 76 about to engage the end of the gizzard 99. As the wheel 67 continues to rotate, the bifurcated portions of the claw 76 straddle the knife blade, and the gizzard 99 after having been pierced from end to end on the pointed knife end 51 is bodily drawn or pulled along the tapered and gradually widening knife blade so that the cutting edge 52 of the blade effects a lateral incision which splits the gizzard from the inside outwardly. In the meantime, of course, the presser member 86 in the B' position is depressed inwardly to a slight extent to accommodate and hold the gizzard 99. As is well known, the usual poultry gizzard has an elongated ridge 100 at one side thereof which fits naturally into the V-shaped groove or trough 89 in the plate 86 and it is desirable that the operator initially impaling the gizzards on the pales 37 take care to orient each impaled gizzard so that the longitudinal ridge portion thereof is outermost and is thereby adapted to be received within the groove 89 of the spring pressed plate 86. As will readily be understood, our machine is capable of accommodating gizzards of varying sizes by reason of the spring pressed openable clamp arm 41 on each gizzard holder and also by reason of the resilient inward movability of the pressers or flappers 86.

The blade portion of the knife means 48 with its pointed end 51 and cutting edge 52 has a substantially uniform restricted thickness, as best seen in Fig. 8, but the cutting edge 52 extends in a gradual curve along the length of the blade (Figs. 4 and 5) so that the blade becomes gradually wider in the plane of the rotating wheel 67 and in the direction of rotary movement thereof. The opposite end of the knife blade merges integrally in a smooth continuous curvature with a hollow body 101 having oppositely disposed side walls diverging laterally from the longitudinal axis of the knife blade. Upon continued rotation of the wheel 67, the split open gizzard 99 is pulled bodily by the claw portion 76 across the spreader body 101 in order to spread apart the split gizzard for exposing the interior thereof as seen at position C' in Figs. 4 and 5. At the same time, the cam roller 79 has now completely disengaged from the cam track 84 so that the spring 81 returns the claw portion 76 to retracted position with the screw abutment 83 in engagement with the rim 69 thereby shifting the claw portion 76 out of the path of the widened spreader body 101. As will readily be understood from Fig. 8, the bifurcated claw 76 easily straddles the thin elongated knife blade but must be retracted inwardly relative to the wheel 67 in order to clear the laterally diverging spreader body 101. The end portion of the hollow spreader body is provided with a plurality of spray apertures or openings 102 and a cleaning fluid such as hot water is supplied to the hollow body 101 through a conduit 103. At the same time, the spring pressed flapper 86 holds the gizzard 99 against the apertured spray area of the hollow body 101 and the jets of water issuing from the latter thoroughly cleanse and remove the interior contents of the gizzard.

Extending circumferentially and continuously from the spray end of the hollow body 101 is an elongated curved track or guideway consisting in this case of a plurality of parallel spaced wires 104 extending along the circumferential path of the wheel 67 and terminating abruptly, as at 105, in the region of the discharge chute 19. As the wheel 67 rotates, the spring pressed flapper 86 holds the split open and spread gizzard 99 flatwise against the grid or track 104 and the pressure of this flapper together with the limited endwise engagement of the retracted claw portion 76 against the gizzard is sufficient to move the gizzard along the track 104 toward the outlet end of the machine. During this passage, the spread apart gizzard is further cleaned as at position D' by a plurality of water sprays issuing from an apertured header 106 disposed on the opposite side of the open mesh grid or track 104. Water is supplied to the header 106 through a pipe 107 extending through the side of the housing 12, and the conduit 103 also connects with the header 106 for supplying water to the spray portion of the spreader body 101.

As the wheel 67 continues to rotate, the gizzard 99 is eventually pulled from the end 105 of the track 104 and at that instant the spring pressed flapper blade 86 is released as the claw and flapper mechanism clears the track 104 whereupon the completely opened and cleaned gizzard is positively ejected or flipped from the carrier mechanism by snap action as the released flapper 86 is pivoted into its outermost position by the action of the spring 97 (see position E'). The ejected gizzard falls onto the inclined discharge chute 19 which is likewise in the form of a plurality of open mesh rods or wires 108.

The water or other fluid supplied to the sprays 102 and 106 together with the gizzard contents washed away by the spray fall to the bottom 64 of the housing 12 and are discharged to waste through a depending drain or overflow pipe 109. In addition, an inclined drip pan 111 (Fig. 3) underlies the initial portion of the discharge chute 19 so that liquid draining from the ejected gizzards will likewise be discharged through the waste pipe 109. A horizontal screen 112 (Fig. 6) is mounted below the feed unit 17 and part of the carrier unit 18 to catch any gizzards which may accidentally fall from the device. Although as illustrated in the drawings in this particular embodiment of the invention the rotatable feed and carrier units 17 and 18 are mounted in a horizontal plane for rotation about vertical axes, it will be understood that the same operating principles may apply if the units are mounted for rotation in a vertical plane. For sanitary and other reasons, we prefer the horizontal arrangement shown herein because of the unusual cleanliness of the device. In fact, the apparatus as shown herein is to a large extent "self-cleaning" since the spray water drains downwardly and away from the operating mechanism and contamination of the apparatus with removed gizzard contents and the like is largely avoided.

From the foregoing, it will be seen that we have provided a unique highly compact apparatus for both opening and cleaning poultry gizzards. By utilizing a combination of a rotatable feeder unit and a rotatable carrier unit, we are able to achieve a very substantial increased speed of operation and production rate for our machine as compared with devices heretofore known in this field. In addition, the use of a separate feeder permits the most dangerous portions of the machine to be enclosed and located remotely from the operator, only the relatively less dangerous feeder unit being exposed sufficiently to permit feeding of the gizzards. As heretofore described, the separate feed unit makes it possible to impale the gizzards on pointed members which are at all times moving away from the operator so as to minimize the danger of injury to operating personnel. It will, of course, be understood that although only water sprays are shown for cleaning out the interior of the split and spread gizzards, other cleaning and processing elements such as brushes, abrading rollers, grinders and the like may also be provided around the periphery of the carrier unit 18 as desired.

Although the invention has been described with reference to a particular structural embodiment thereof, it will be understood that various modifications and alternative structures may be resorted to without departing from the scope of the invention as defined in the appended claims.

We claim:

1. An apparatus for opening poultry gizzards comprising rotatable feed means adapted to have a plurality of gizzards mounted thereon, rotatable carrier means disposed in coacting position adjacent said feed means, stationary knife means supported in the path of movement of said feed means and said carrier means, and means for driving said feed means and said carrier means in synchronized relation whereby the gizzards are transferred one at a time from said feed means to said knife means and are moved in cutting relation along the knife means by said carrier means for slitting open the gizzards.

2. An apparatus for opening poultry gizzards comprising rotatable feed means adapted to have a plurality of gizzards mounted thereon, rotatable carrier means disposed in coacting position adjacent said feed means, stationary knife means supported intermediate said feed means and said carrier means, said knife means having a pointed end and an elongated cutting edge disposed in the path of movement of said feed means and said carrier means, and means for driving said feed means and said carrier means in synchronized relation whereby the gizzards on said feed means are impaled one at a time on said pointed end and are thereafter moved along said cutting edge by said carrier means for piercing and slitting open the gizzards.

3. An apparatus for opening poultry gizzards comprising a pair of rotatable supports mounted side by side for rotation about parallel axes, a plurality of gizzard holders extending radially from one of said supports for receiving a plurality of gizzards, multiple claw means carried on the other of said supports, stationary knife means disposed intermediate said rotatable supports and having a pointed end and an elongated tapered cutting edge in the path of movement of said holders and said claw means, and drive means connected to said supports for rotating the same in synchronized relation whereby the gizzards are impaled on the pointed end of said knife means one at a time as said holders move in proximity to said knife means and whereby the impaled gizzards are thereafter engaged by said claw means and moved along said cutting edge thereby piercing and slitting open the gizzards.

4. The apparatus of claim 3 further characterized in that said supports are both rotated toward the pointed end of said knife means.

5. The apparatus of claim 3 further characterized in that said axes are vertical and said supports are rotatable in a horizontal plane.

6. The apparatus of claim 3 further characterized in that said one support comprises adjustable means for regulating the rotary and radial positions of said holders relative to said claw means whereby said holders and said claw means are disposed in interdigitating relation during rotation of said supports.

7. An apparatus for opening poultry gizzards comprising in combination, rotatable gizzard feed means having a rotatable driven member, an annular support mounted on said member and rotatably adjustable relative to said member, and a plurality of gizzard holders extending radially from said support for receiving a plurality of gizzards, said holders being radially adjustable relative to said annular support; rotatable gizzard carrier means in coacting position adjacent said feed means and including a rotatable support and a plurality of claw means carried in circumferentially spaced relation therearound; the rotary adjustability of said annular support relative to said member and the radial adjustability of said holders relative to said annular support permitting said holders to be adjusted both circumferentially and radially for disposing said holders and said claw means in interdigitating relation during rotation of said feed means and said carrier means; stationary knife means disposed intermediate said feed means and said carrier means and having a pointed end and an elongated tapered cutting edge in the path of rotational movement of said holders and said claw means; and drive means connected to said rotatable driven member and to said rotatable support for rotating the same in synchronized relation whereby the gizzards are impaled on the pointed end of said knife means one at a time as said holders move in proximity to said knife means and whereby the impaled gizzards are thereafter engaged by the interdigitated claw means and moved along said cutting edge thereby piercing and slitting open the gizzards.

8. The apparatus of claim 3 further characterized in that each of said gizzard holders comprises an elongated radially extending arm, a pale rigidly carried on the outer end of said arm at substantially right angles therewith and adapted to have one end of a gizzard impaled thereon, a clamp member pivotally connected to said arm for engaging the other end of the gizzard, and resilient means releasably urging said clamp member toward said arm.

9. An apparatus for opening poultry gizzards comprising rotatable feed means for receiving a plurality of gizzards, movable carrier means mounted in coacting relation adjacent said feed means, stationary knife means supported intermediate said feed means and said carrier means, said knife means having a pointed end and an elongated cutting edge disposed in the path of movement of said feed means and said carrier means, a plurality of normally closed but openable gizzard holders on said feed means, cam means for successively opening said holders during rotation of said feed means for permitting gizzards to be mounted on the open holders, the holders thereafter closing on the gizzards during continued rotation of the feed means, and drive means connected to said feed means and said carrier means for driving the same in synchronized relation whereby the gizzards carried by said holders during said continued rotation are impaled one at a time on the pointed end of said knife means and the impaled gizzards are thereafter moved along said cutting edge by the moving carrier means for piercing and slitting open the gizzards, said holders being openable for releasing the gizzards therefrom during impalement on said pointed end.

10. An apparatus for opening poultry gizzards comprising rotatable feed means for receiving a plurality of gizzards, movable carrier means mounted in coacting relation adjacent said feed means, stationary knife means supported intermediate said feed means and said carrier means, said knife means having a pointed end and an elongated cutting edge disposed in the path of movement of said feed means and said carrier means, a plurality of gizzard holders extending radially from said feed means, said gizzard holders each comprising a pair of pivotally connected pale and clamp members with spring means releasably urging said members together in closed relation whereby a gizzard impaled at one end thereof on said pale member is releasably held at the other end thereof by said clamp member, individual cam elements carried by said holders on one of the pivotally connected members thereof, a stationary cam track mounted adjacent said feed means and coacting with said cam elements for successively opening said pivotally connected pale and clamp members during rotation of said feed means to permit manual feeding of gizzards onto said pale members, said pivotally connected members being thereafter closed by said spring means during continued rotation of said fed means and disengagement of said cam elements from said cam track, and drive means connected to said feed means and said carrier means for driving the same in synchronized relation whereby the gizzards carried by said holders during said continued rotation are impaled on the pointed end of said knife means one at a time as the holders move in proximity to the knife means, said spring means permitting opening of the pivotally connected pale and clamp members for releasing the gizzards therefrom during said continued rotation, and whereby the impaled gizzards are thereafter moved along said cutting edge by the moving carrier means thereby piercing and slitting open the gizzards.

11. An apparatus for opening poultry gizzards comprising rotatable feed means for receiving a plurality of gizzards, movable carrier means mounted in coacting relation adjacent said feed means, stationary knife means supported intermediate said feed means and said carrier means, said knife means having a pointed end and an elongated cutting edge disposed in the path of movement of said feed means and said carrier means, said feed means including a rotatable support, and a plurality of gizzard holders carried by said support, said holders each including a rigid pale arm extending radially from said support with a laterally extending pale at the outer end for receiving a gizzard thereon, a clamp arm pivotally connected to the pale arm for holding the gizzard on the pale, and spring means connected to said arms for normally holding the clamp arm in closed position, a plurality of cam rollers mounted on the clamp arms of said holders, and a rigid cam track mounted in the path of movement of said cam rollers for coaction therewith whereby the clamp arms of said holders are successively opened to permit gizzards to be mounted manually on the pales of said holders during one rotary position of the support, said spring means thereafter closing the clamp arms on the gizzards during continued rotation of the support, and drive means connected to said support and said carrier means for driving the same in synchronized relation whereby the pales with the gizzards thereon are successively aligned with the pointed end of the knife means during said continued rotation and the gizzards are transferred one at a time to the pointed end of the knife means in impaled position thereon for subsequent piercing and slitting movement therealong by said carrier means, the clamp arms of said holders being automatically openable against the action of said spring means for releasing the gizzards from the holders during transfer of the gizzards to the knife means.

12. The apparatus of claim 3 further characterized in that said multiple claw means comprises a plurality of hook-shaped members pivotally secured to said other support in circumferentially spaced relation, each of said hook-shaped members having a bifurcated end portion adapted to be projected from said other support for straddling said knife means and engaging the end of a gizzard impaled thereon whereby to move the gizzard along the knife means during rotation of said other support.

13. An apparatus for opening poultry gizzards comprising elongated stationary knife means having a pointed end and a cutting edge, means for impaling gizzards one at a time on said pointed end, and carrier means for moving the impaled gizzards along said cutting edge whereby to pierce and slit open the gizzards, said carrier means comprising a rotatably driven support mounted adjacent said knife means, and a plurality of bifurcated gizzard-engaging members carried on said support and adapted to straddle said knife means for successively engaging the impaled gizzards during rotation of said support.

14. An apparatus for opening poultry gizzards comprising stationary knife means with an elongated point at one end and a cutting edge extending therefrom, laterally diverging spreader means at the opposite end of said knife means, means for impaling gizzards one at a time on said point, a rotatably driven support mounted adjacent said knife means and spreader means, a plurality of gizzard-engaging members movably secured to said support in circumferentially spaced relation and having bifurcated portions adapted to straddle said knife means for successively engaging the impaled gizzards during rotation of said support and thereby moving the impaled gizzards along said cutting edge and said spreader means for piercing, slitting, and spreading the gizzards, and means operatively coacting with said gizzard-engaging members for first projecting said bifurcated portions into straddling relation with respect to said knife means and thereafter retracting said bifurcated portions to clear said diverging spreader means during continued rotation of said support.

15. The apparatus of claim 14 further characterized in that each of said gizzard-engaging members has operatively associated therewith a presser member movably mounted on said support and resilient means urging the presser member outwardly for engaging the gizzard and holding the same against said knife means and said spreader means while the gizzard is moved therealong by the gizzard-engaging member.

16. An apparatus for opening poultry gizzards comprising stationary knife means with an elongated point at one end and a cutting edge extending therefrom, laterally diverging spreader means at the opposite end of said knife means, means for impaling gizzards one at a time on said point, a rotatably driven support having a peripheral rim and mounted adjacent said knife means and said spreader means, a plurality of hook-shaped claws pivotally secured to said rim in circumferentially spaced relation therearound, said claws having bifurcated gizzard-engaging portions adapted to straddle said knife means for successively engaging the impaled gizzards during rotation of said support whereby to move the impaled gizzards along said cutting edge and said spreader means for piercing, slitting, and spreading the gizzards, spring means coacting with said claws for urging the claws into normally retracted position relative to said rim, a plurality of presser members rockably mounted on said rim adjacent said claws, spring means coacting with said presser members and urging the latter outwardly from said rim for resiliently engaging the gizzards and holding the same against said knife means and said spreader means while the gizzards are moved therealong by said gizzard-engaging portions, said presser members being resiliently depressible inwardly of said rim for accommodating gizzards of varying size, and cam means operatively coacting with said claws for first projecting said bifurcated gizzard-engaging portions into straddling relation with respect to said knife means and thereafter retracting said bifurcated portions to clear said diverging spreader means during continued rotation of said support.

17. The apparatus of claim 16 further characterized in that said rim has a plurality of openings for receiving the inwardly depressible presser members and for permitting projection and retraction of the bifurcated portions of said claws, and said presser members and said claws are provided with abutment means engageable with said rim for limiting the extent of inward depression and retraction, respectively.

18. The apparatus of claim 16 further characterized in that said cam means comprises a stationary cam track mounted adjacent said support and a plurality of cam elements carried on the spring-pressed claws, said cam elements being engageable with said cam track during rotation of said support for pivoting the claws outwardly and projecting the bifurcated portions thereof into straddling relation with respect to said knife means and said cam elements being disengageable from said cam track during further rotation of the support whereby to permit retraction of the claws by the spring means connected thereto.

19. In an apparatus for opening poultry gizzards, the combination of an elongated stationary knife having an elongated cutting edge and a point at one end adapted to have poultry gizzards impaled thereon one at a time, spreader means diverging laterally from the longitudinal axis of said knife at the opposite end thereof, a rotatably driven support mounted adjacent said knife, a plurality of claw members pivotally mounted in circumferentially spaced relation on said support, said claw members having bifurcated gizzard-engaging portions adapted to straddle said knife for moving the impaled gizzards along said cutting edge and said spreader means to pierce, slit, and spread the gizzards during rotation of said support, means for projecting the gizzard-engaging portions of the pivotally mounted claws into straddling relation with respect to the knife in one rotary position of said support, and means for retracting said portions to clear said spreader means during a subsequent rotary position of said support.

20. The apparatus of claim 19 further characterized in that each of said claw members has associated therewith a presser member rockably mounted on said support and means resiliently urging the presser member outwardly for engaging the corresponding gizzard and holding the same in operative position against said knife and said spreader means during rotation of said support.

21. An apparatus for opening and cleaning poultry gizzards comprising an elongated stationary knife having an elongated point at one end and a cutting edge extending therefrom, a combined spreader and spray unit at the other end of said knife comprising a hollow body having opposed walls diverging laterally from the longitudinal axis of said knife, said body having a plurality of spray apertures, means for supplying a spray fluid to said hollow body, means for impaling gizzards one at a time on the pointed end of said knife, a rotatably driven support mounted adjacent said knife and said unit, and a plurality of gizzard-engaging members carried on said support for successively engaging the impaled gizzards and moving the same along said cutting edge and said unit for piercing, slitting, spreading, and washing the gizzards.

22. The apparatus of claim 21 further characterized in that said knife is integrally connected to said spreader and spray unit with the cutting edge of the knife merging smoothly into said laterally diverging walls.

23. In a gizzard opening and cleaning apparatus, a combined gizzard spreader and spray unit comprising a hollow body having a pair of laterally diverging walls with a plurality of spray apertures in said body, and means for supplying a spray fluid to said hollow body whereby a split gizzard is adapted to be moved along said body in pressed relation thereagainst for spreading the split gizzard and washing out the gizzard contents.

24. In a gizzard opening and cleaning apparatus, a combined cutting, spreading, and spray unit comprising an elongated knife having a point at one end adapted to have a gizzard impaled thereon and a cutting edge extending from said point, a hollow body integrally connected to said knife at the other end thereof and having a pair of opposed side walls merging smoothly with said knife and diverging laterally from the longitudinal axis of the knife, said body having a plurality of spray apertures, and means for supplying a spray fluid to said hollow body whereby a gizzard impaled on said point is adapted to be moved along said cutting edge for splitting the gizzard and thereafter moved along said body in pressed relation thereagainst for spreading the split gizzard and washing out the gizzard contents.

25. An apparatus for opening and cleaning poultry gizzards comprising a rotatably driven support; elongated stationary knife means having an elongated point at one end and a cutting edge extending therefrom; spreader means at the opposite end of said knife means; an elongated track with openings therethrough, said track extending from said spreader means and having a terminus remote from said spreader means; said knife means, said spreader means, and said track being disposed in a continuous interconnected path extending circumferentially around said rotary support; means for impaling gizzards on the point of said knife means; spray means for directing cleaning fluid inwardly through the openings in said track; a gizzard-engaging member carried by said support for engaging a gizzard impaled on said point and moving the gizzard along said cutting edge, said spreader means, and said track during rotation of said support whereby the gizzard is successively pierced, split, spread, and washed by said fluid; and outwardly urged presser means associated with said gizzard-engaging member for resiliently pressing the gizzard against the knife means, spreader means, and track, said presser means causing the gizzard to be positively ejected from the apparatus as said support rotates beyond the terminus of said track.

26. An apparatus for opening and cleaning poultry gizzards comprising in combination a housing having side and bottom walls providing a receptacle with a fluid drain therefrom, a pair of rotatable supports mounted side by side within said housing on vertical axes for rotation in a horizontal plane above the bottom wall of said receptacle, means located exteriorly of said receptacle for driving said supports in synchronized relation, stationary knife means mounted between said supports and in the path of movement thereof, feed means on one of said supports for receiving a plurality of gizzards and transferring the gizzards to said knife means, carrier means on the other of said supports for moving the gizzards in cutting relation along the knife means and thereby slitting open the gizzards, and spray means mounted adjacent said knife means for cleaning and removing the contents of the slit gizzards, the fluid from said spray means and the removed gizzard contents draining freely from the horizontally mounted supports and being received by said receptacle whereby to provide automatic substantially self-cleaning operation of the apparatus.

No references cited.